Figure 1:
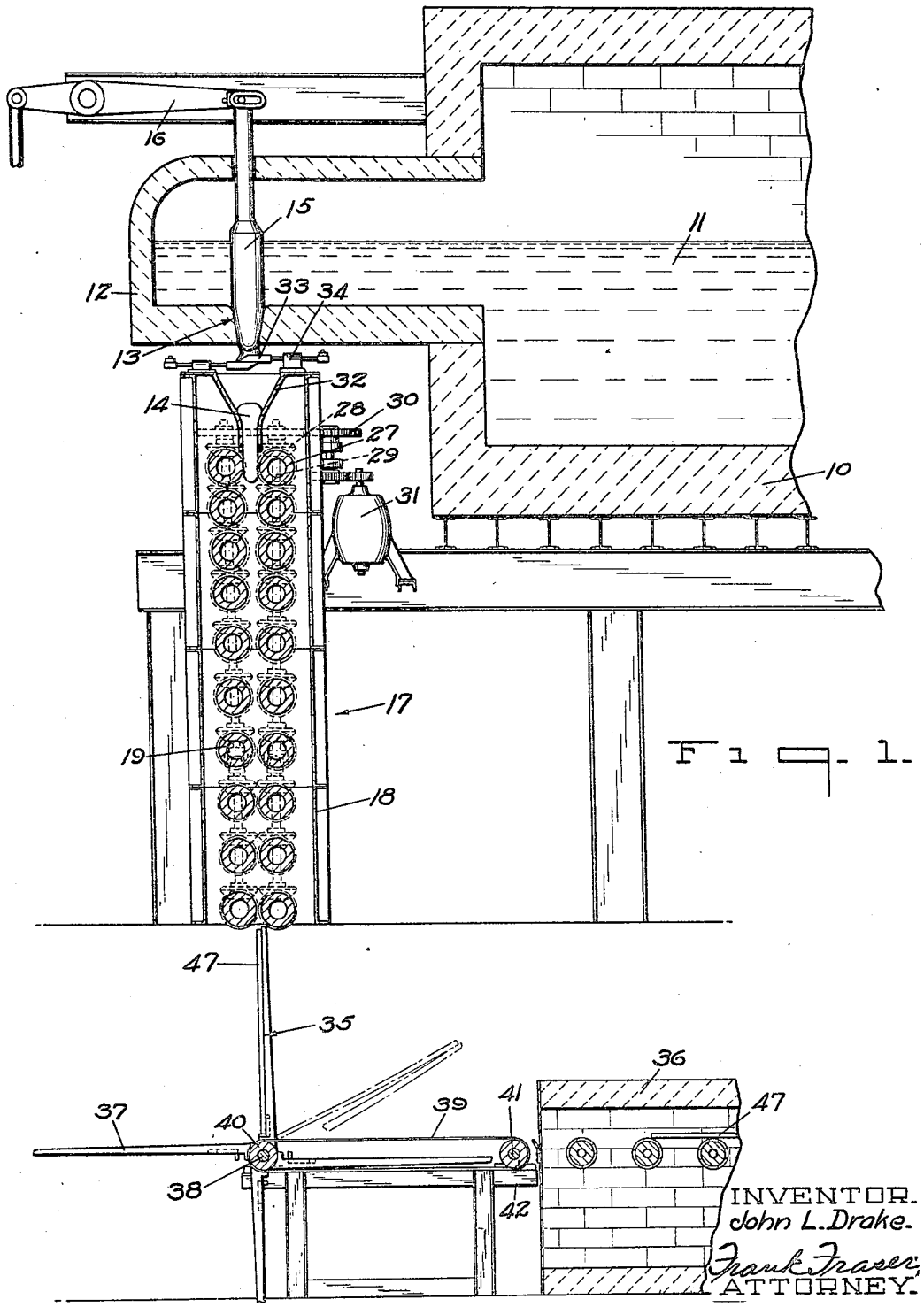

Oct. 23, 1928.

J. L. DRAKE 1,688,528

SHEET FORMING APPARATUS

Filed April 29, 1925  2 Sheets-Sheet 1

INVENTOR.
John L. Drake.
Frank Fraser
ATTORNEY.

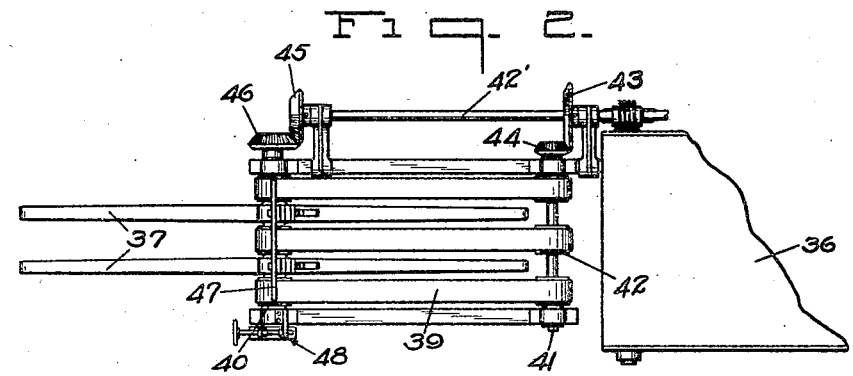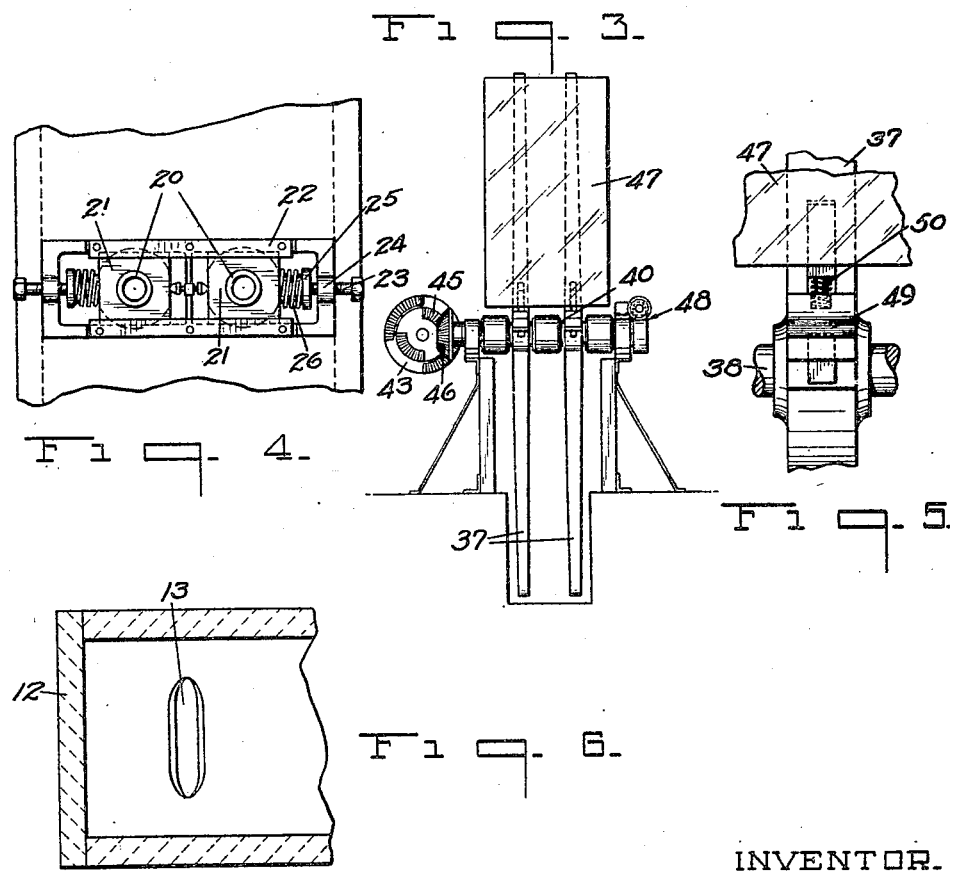

Patented Oct. 23, 1928.

1,688,528

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

SHEET-FORMING APPARATUS.

Application filed April 29, 1925. Serial No. 26,600.

The present invention relates to sheet glass apparatus, and has particular reference to the formation of blanks for use in plate glass manufacture.

An important object of the invention is to provide an apparatus wherein plate glass blanks can be rapidly formed, the said apparatus being capable of producing a flat uniform thickness of sheet.

Another object of the invention is to provide an apparatus wherein a predetermined charge or mass of glass can be rapidly and easily transformed into a flat predetermined size sheet for use in plate glass manufacture.

A further object of the invention is to provide an apparatus for producing plate glass blanks wherein a charge of glass is fed through a plurality of relatively high speed rolls whereby the charge of glass is very rapidly transformed into a plate glass blank of a predetermined size and thickness.

Still another object is to provide an apparatus of this nature wherein the sheet formed by passing a charge of glass between a plurality of high speed rolls is discharged upon a suitable member where it is transferred to an annealing leer as will be understood.

Other objects and advantages of the invention will become apparent during the course of the following description.

In the drawings wherein like numerals are employed to designate like parts throughout the same, Fig. 1 is a vertical longitudinal section illustrating the device in operation, Fig. 2 is a top plan view of the sheet transferring mechanism, Fig. 3 is an end view thereof, Fig. 4 is an enlarged end view of the roll mounting mechanism, Fig. 5 is a detail of a portion of the sheet transfer mechanism, and Fig. 6 is a top plan view of one form of discharge opening through which the glass is forced.

It is now common practice to produce plate glass blanks by rolling a large quantity of molten glass upon a table. Considerable difficulty and expense is involved in this procedure as it is difficult to roll a large mass of glass upon a table in the usual manner before the glass sets up.

In the present invention the blanks are produced by creating a discharge or gob of glass of predetermined size and permitting it to be run between numerous pairs of preferably high speed rolls to flatten the gob out into sheet form. Because of the rapidity with which the gob can be run through the pairs of rolls it is possible to feed one gob after another through the rolls with a very slight space of time between each discharge.

In the drawings, in Fig. 1, is shown a form of tank furnace 10 containing a mass of molten glass 11. The discharge end 12 of the furnace is provided with a suitable opening 13 which is preferably substantially the shape as shown in Fig. 6. It is desirable to make the opening 13 elongated so that a relatively flat gob or charge of glass 14 can be discharged therethrough. A plunger 15 operable by means of the cross arm 16 is adapted to be moved in a vertical position intermittently to open and close the opening 13. Any form of timing mechanism can be used to control the rapidity at which the plunger 15 is operated. The plunger 15 is operated by the member 16 in a manner that successive gobs of glass 14 are forced through the opening 13.

Gob feeders, as such arrangements are called, are old and well-known, especially in the bottle manufacture and analogous arts. In view of this fact this invention is not to be construed as being limited to the type of plunger disclosed in the drawings.

Arranged below the discharge opening 13 is a sheet forming mechanism designated in its entirety by the numeral 17, and comprises a housing 18 in which is mounted a plurality of pairs of rotatable rolls. The rolls 19 are formed from a highly polished, non-corrosive alloy, and are carried upon the shafts 20 which are supported in adjustable journals 21, slidably mounted in the slideways 22. An adjusting screw 23 operable through the lug 24 is adapted to bear against the plate 25 carried by the journal 21. A resilient member 26 is interposed between the collar and journal to normally urge the journal members 21 in opposite directions.

As is clearly shown in Fig. 1, during the operation of the machine, the upper rolls 19 are spaced further apart than the lower rolls, while the intermediate rolls are gradually positioned more closely together from the top to the bottom. Thus a relatively thick gob passes between the first set of rolls and is gradually reduced in thickness as it passes down between the succeeding sets of rolls. To rotate the rolls, they are provided with bevel gears 27 at their ends which mesh with the bevel gears 28 carried upon the shaft 29 and deriving power through the train of gears 30 connected to the source of power 31.

The rolls 19 are rotated in a direction to feed the gob of glass 14 downwardly and are preferably rotated at a high speed to send the gob of glass through the sheet forming compartment 17 as rapidly as possible to prevent the sheet from becoming too viscous or set up before it is reduced to its final desired dimensions. A hopper or trough 32 is provided in the top of the compartment 17 to guide the charge of glass released from the furnace and cut off by the cutting members 33. The cutting members 33 are adapted to be reciprocated through the bearings 34, whereby the cutting edges will move in parallel relationship at all times, giving an absolutely true cut.

Ordinarily the width of the sheet can be controlled by the length of the slot 13 through which the glass passes from the furnace. It is then merely necessary to roll the gob to whatever length and thickness is desired. Obviously, the thickness of the sheet produced is determined by the relative adjustments of the rolls through which the sheet passes. It is also thought desirable to adjust the last few sets of rolls to the same adjustments, leaving the same distance between the rolls to insure that a good flat uniform thickness of sheet is produced.

As it is desirable to pass the sheet through rolls arranged in a vertical position the transfer mechanism 35 is provided for deflecting the sheet to a horizontal plane where it can be passed through an annealing leer 36. The transfer mechanism comprises a plurality of arms 37 carried by a central shaft 38. The arms 37 are spaced, as is shown in Fig. 2 to permit endless belts or conveyors 39 to be trained over pulleys 40 carried by the shaft 38. A second shaft 41 is provided and carries a plurality of pulleys 42 in alignment with the pulleys 40 and over which the conveyors 39 travel. The pulleys 40 are not keyed and do not rotate with the shaft 38. A drive shaft 42' is positioned alongside of the conveyors 39 and carries a bevel gear 43 adapted to mesh with the pinion 44 keyed to the shaft 41, while a second gear 45 is carried and meshes with the gear 46 carried by the shaft 38. As is shown in Fig. 3, the master gears 43 and 45 are provided with driving sections and smooth sections, the driving portion of the gear 45 being in mesh with the gear 46, while the toothed portion of the gear 43 is not in mesh with the gear 44. This makes it possible to rotate the arms in a manner that they will be brought to a stop at a point as shown in Fig. 1 ready to receive the sheet 47 which has been passed out from the rolls. To make sure that the arms will not coast by their desired location, a braking mechanism 48 is provided to create a constant drag on the shaft 38, so that when the smooth portion of the gear 45 is brought adjacent the pinion 46, the shaft 38 will immediately stop. As the gear 45 rotates further it will again come in mesh, whereby the arm 37 will be moved in a manner to permit the sheet to rest upon the conveyors 39 after which it will be transferred to the annealing leer 36. As is seen, the arms 37 will pass down between the numerous conveyor belts 39. To prevent damage to the sheet as it passes from the rolling mechanism to the transfer device, a shock-absorber comprising a plate 49 and a spring 50 is used. As is seen the sheet will engage the plate 49 and the spring 50 will receive the shock, thus preventing shattering of the sheet.

With this type of apparatus plate glass blanks can be rapidly formed by timing a gob feeding mechanism to discharge sufficient quantity of glass at intervals which are adapted to be rolled into blanks of a predetermined size. The gob feeding mechanism and sheet transfer mechanism are timed depending upon the type of blank being formed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a glass furnace, containing molten glass, means to discharge a gob of glass from the furnace, and a plurality of pairs of superimposed rotatable members between which the glass is adapted to pass to be reduced to sheet form.

2. In sheet glass apparatus, a glass furnace containing molten glass, means to discharge successive gobs of glass from the furnace, and superimposed means for reducing the glass through successive stages to predetermined dimensions.

3. In sheet glass apparatus, a glass furnace containing molten glass, means to discharge a gob of glass therefrom, and a plurality of sets of rolls between which the gob may be run to reduce it through successive stages to the desired dimensions.

4. In sheet glass apparatus, a glass furnace containing molten glass, means to discharge a gob of molten glass therefrom, means for reducing the gob to sheet form, and means for deflecting the sheet from one plane to another.

5. In sheet glass apparatus, a glass furnace containing molten glass, means to discharge an elongated gob therefrom, and means for reducing the gob to the desired thickness of sheet.

6. In sheet glass apparatus, a glass furnace containing molten glass, means to discharge a gob of molten glass therefrom, the said gob having a width substantially the width of the sheet desired, and means for reducing the gob to the desired length of sheet.

7. In sheet glass apparatus, a glass furnace containing molten glass, means to discharge a gob of molten glass therefrom, the gob having a width substantially the same as the width of sheet desired, and means for reducing the gob through successive stages to predetermined dimensions.

8. In sheet glass apparatus, a glass furnace containing molten glass, means to discharge a gob of molten glass therefrom, the gob having substantially the width of the sheet desired, and a plurality of sets of rolls between which the gob may pass to reduce it to predetermined dimensions.

9. In sheet glass apparatus, a plurality of sets of rotatable sheet forming rolls the distance between the rolls in each set being progressively less from one end of the sets of rolls toward the other end thereof, and means for discharging a gob of molten glass in a manner to cause it to be run between said rolls.

10. In sheet glass apparatus, a plurality of rotatable sheet forming rolls arranged in spaced relationship the distance between the rolls in each set being progressively less from one end of the sets of rolls toward the other end thereof, and means for feeding successive gobs of glass to the said rolls.

11. In sheet glass apparatus, a glass furnace containing molten glass, gob feeding mechanism associated therewith for successively discharging gobs of glass from the furnace, and a plurality of sets of rolls arranged below the gob feeder for reducing each to sheet form.

12. In sheet glass apparatus, a plurality of sets of rolls, the upper set of rolls being spaced relatively far apart and the lower set of rolls being spaced relatively close together, and means for passing successive gobs of glass between the rolls to reduce it to sheet form.

13. In sheet glass apparatus, a tank containing a mass of molten glass, means to discharge a gob of glass therefrom, and means for reducing the gob through successive stages to sheet form in a vertical position.

14. In sheet glass apparatus, a tank containing molten glass, means to discharge successive gobs of glass therefrom, a plurality of pairs of superimposed rotatable members in proximity to the tank and receiving the gobs of glass therefrom and reducing them to the desired dimensions, and means for guiding the gobs of glass between the said rotatable members.

Signed at Toledo, in the county of Lucas, and State of Ohio, this 27th day of April, 1925.

JOHN L. DRAKE.